(12) United States Patent
Aoyama et al.

(10) Patent No.: US 9,578,233 B2
(45) Date of Patent: Feb. 21, 2017

(54) IMAGING APPARATUS AND METHOD FOR CONTROLLING THE SAME

(71) Applicant: CANON KABUSHIKI KAISHA, Tokyo (JP)

(72) Inventors: Satoshi Aoyama, Kawasaki (JP); Tetsuya Hada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 14/577,053

(22) Filed: Dec. 19, 2014

(65) Prior Publication Data

US 2015/0189141 A1 Jul. 2, 2015

(30) Foreign Application Priority Data

Dec. 26, 2013 (JP) ................................. 2013-269685
Dec. 26, 2013 (JP) ................................. 2013-269686

(51) Int. Cl.
*H04N 5/232* (2006.01)
*H04N 5/272* (2006.01)

(52) U.S. Cl.
CPC ...... *H04N 5/23216* (2013.01); *H04N 5/23293* (2013.01); *H04N 5/272* (2013.01)

(58) Field of Classification Search
CPC .......................... H04N 5/2258; H04N 5/23293
See application file for complete search history.

(56) References Cited

U.S. PATENT DOCUMENTS

| | | | | |
|---|---|---|---|---|
| 8,866,943 B2* | 10/2014 | Park | ................... | H04N 5/23222 348/139 |
| 8,988,558 B2* | 3/2015 | Chong | ................. | H04N 5/2258 348/211.3 |
| 2003/0117501 A1* | 6/2003 | Shirakawa | ........... | H04N 5/2251 348/218.1 |
| 2012/0008011 A1* | 1/2012 | Garcia Manchado | . | G03B 15/08 348/231.2 |
| 2012/0274808 A1* | 11/2012 | Chong | ................. | H04N 5/2258 348/234 |
| 2014/0354759 A1* | 12/2014 | Cranfill | .................. | H04N 7/147 348/14.1 |

FOREIGN PATENT DOCUMENTS

JP 2005094741 A 4/2005

* cited by examiner

*Primary Examiner* — James Hannett
(74) *Attorney, Agent, or Firm* — Canon U.S.A., Inc. IP Division

(57) ABSTRACT

There is provided an imaging apparatus including a plurality of imaging units, and capable of recording a situation when a photographer captures a still image, and a change or reaction of the person such as the photographer other than the objects in the still image. The imaging apparatus includes a first imaging unit, a second imaging unit, an imaging instruction unit configured to instruct the first imaging unit to capture a still image, and a control unit configured to record a still image captured by the first imaging unit in a recording medium and to record a moving image captured by the second imaging unit in the recording medium when the imaging instruction unit instructs the first imaging unit to capture a still image.

23 Claims, 7 Drawing Sheets

FIG.7

| IN-CAMERA IMAGING FUNCTION | MOVING IMAGE DATA RECORDING TIME BEFORE STILL IMAGE CAPTURING | STOP MOTION SETTING | MOVING IMAGE RECORDING PATTERN |
|---|---|---|---|
| ENABLED | $\geq t0$ (2 SECONDS OR LONGER) | — | MOVING IMAGE RECORDING PATTERN 1 |
| ENABLED | $< t0$ (SHORTER THAN 2 SECONDS) | — | MOVING IMAGE RECORDING PATTERN 2 |
| DISABLED | $< t0$ (SHORTER THAN 2 SECONDS) | — | RECORD NO MOVING IMAGE |
| DISABLED | $\geq t0$ (2 SECONDS OR LONGER) | ON | MOVING IMAGE RECORDING PATTERN 3 |
| DISABLED | $\geq t0$ (2 SECONDS OR LONGER) | OFF | MOVING IMAGE RECORDING PATTERN 4 |

IMAGING APPARATUS AND METHOD FOR CONTROLLING THE SAME

BACKGROUND

Field of the Disclosure

The present invention relates to an imaging apparatus including a plurality of imaging units, and a method for controlling the same.

Description of the Related Art

There are imaging apparatuses such as mobile phones and smartphones including an imaging unit (hereinbelow, referred to as an in-camera) facing a user of a mobile phone or the like opposite to an imaging unit for typical imaging (hereinbelow, referred to as an out-camera). In Japanese Patent Application Laid-Open No. 2005-94741, the shutters of the out-camera and the in-camera are released at the same time by one release operation so that a plurality of images can be captured at the same time and the image captured by the in-camera and the image captured by the out-camera can be associated with each other and recorded.

SUMMARY OF THE INVENTION

The present invention is directed to an imaging apparatus including a plurality of imaging units capable of recording as a situation when one imaging unit captures a still image, a change or reaction of a person such as photographer other than the captured persons, and environments.

According to an aspect of the present invention, an imaging apparatus includes a first imaging unit, a second imaging unit, a still image capturing instruction unit configured to instruct the first imaging unit to capture a still image, and a control unit configured to record a still image captured by the first imaging unit in a recording medium and to record a moving image captured by the second imaging unit in the recording medium in response to an instruction from the still image capturing instruction unit to capture a still image.

According to another aspect of the present invention, an imaging apparatus includes a first imaging unit, a second imaging unit, an imaging instruction unit configured to instruct the first imaging unit to capture a still image, a still image recording unit configured to record a still image captured by the first imaging unit in a recording medium in response to an instruction by the imaging instruction unit to capture a still image, a moving image recording unit configured to record an image captured by the first imaging unit as a moving image in the recording medium in response to the instruction by the imaging instruction unit to capture a still image, a first setting unit configured to set whether to record an image captured by the first imaging unit as a moving image, and a second setting unit configured to set whether to record an image captured by the second imaging unit, wherein in a case where the second setting unit has set a setting to record an image captured by the second imaging unit, the moving image recording unit records an image in which an image captured by the first imaging unit is combined with an image captured by the second imaging unit as a moving image irrespective of the setting of the first setting unit.

Further features of the present invention will become apparent from the following description of exemplary embodiments with reference to the attached drawings.

BRIEF DESCRIPTION OF THE DRAWINGS

FIG. 7 is a table illustrating relationships between various settings and the moving image recording patterns.

DESCRIPTION OF THE EMBODIMENTS

Various exemplary embodiments, features, and aspects of the invention will be described in detail below with reference to the drawings.

A digital camera 100 will be described as an example imaging apparatus according to a first exemplary embodiment.

<External Appearance of Digital Camera 100>

Figure 1:
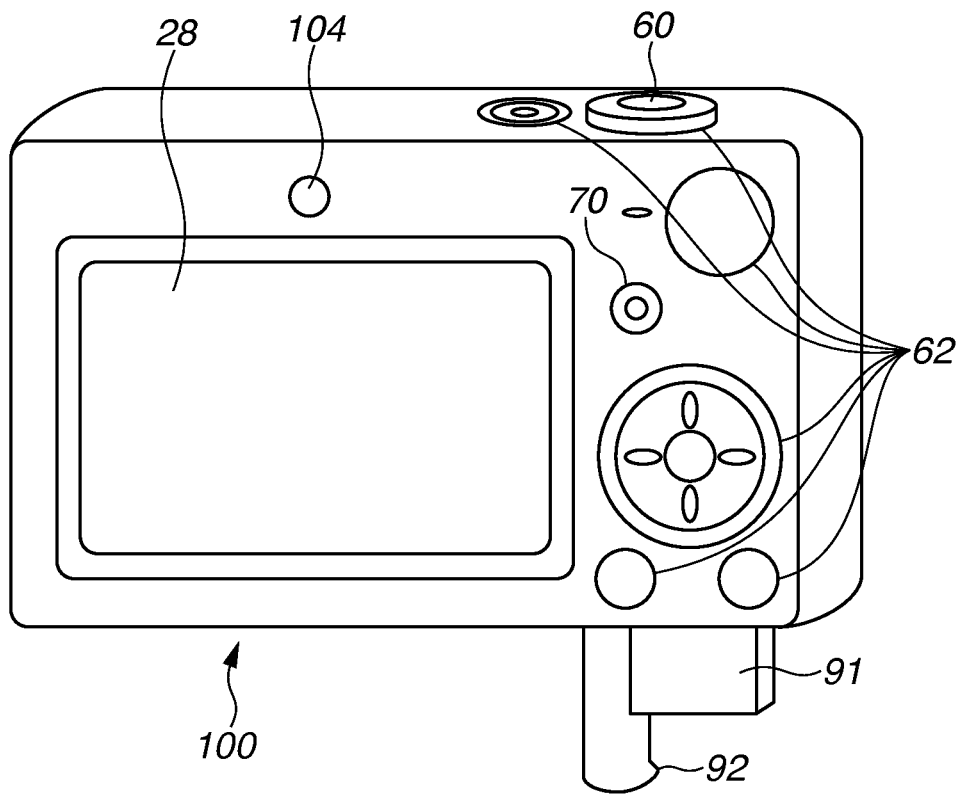
FIG. 1 is a backside view of a digital camera.

FIG. 1 is a backside view of the digital camera 100 as an example imaging apparatus according to the first exemplary embodiment.

A display unit 28 displays images or various items of information. A shutter button 60 is an operation unit for performing a still image capturing instruction. A moving image capturing button 70 is an operation member for performing a moving image capturing instruction. An operation unit 62 includes various operation members such as switches and buttons for accepting various user operations. The operation unit 62 includes a power supply switch for turning the power supply of the digital camera 100 ON or OFF, a mode switch for switching an operation mode of the digital camera 100, a menu button for performing menu setting, and a cross button for designating a menu or setting. A recording medium 91 is a recording medium such as a memory card, or a hard disk. A lid 92 is a lid to be opened and closed for accommodating the recording medium 91.

A camera module 104 captures an image of a photographer who is imaging an object, or an image of a viewer who is viewing an image displayed on the display unit 28, and is made of an imaging lens, an image sensor or the like. Herein below such a camera will be referred to as an in-camera.

The in-camera 104 is arranged to image the side where the display unit 28 of the digital camera 100 is provided to image a viewer or a photographer. FIG. 1 illustrates the external appearance of the backside of the digital camera 100 provided with the display unit 28, and an out-camera as an imaging unit for imaging the object side is provided on the front surface of the digital camera 100. The optical axes (imaging directions) of the out-camera and the sub-camera are substantially parallel to each other, and the direction of the optical axis (imaging direction) of the out-camera is set to be opposite to that of the optical axis (imaging direction) of the sub-camera.

<Configuration of Digital Camera 100>

Figure 2:
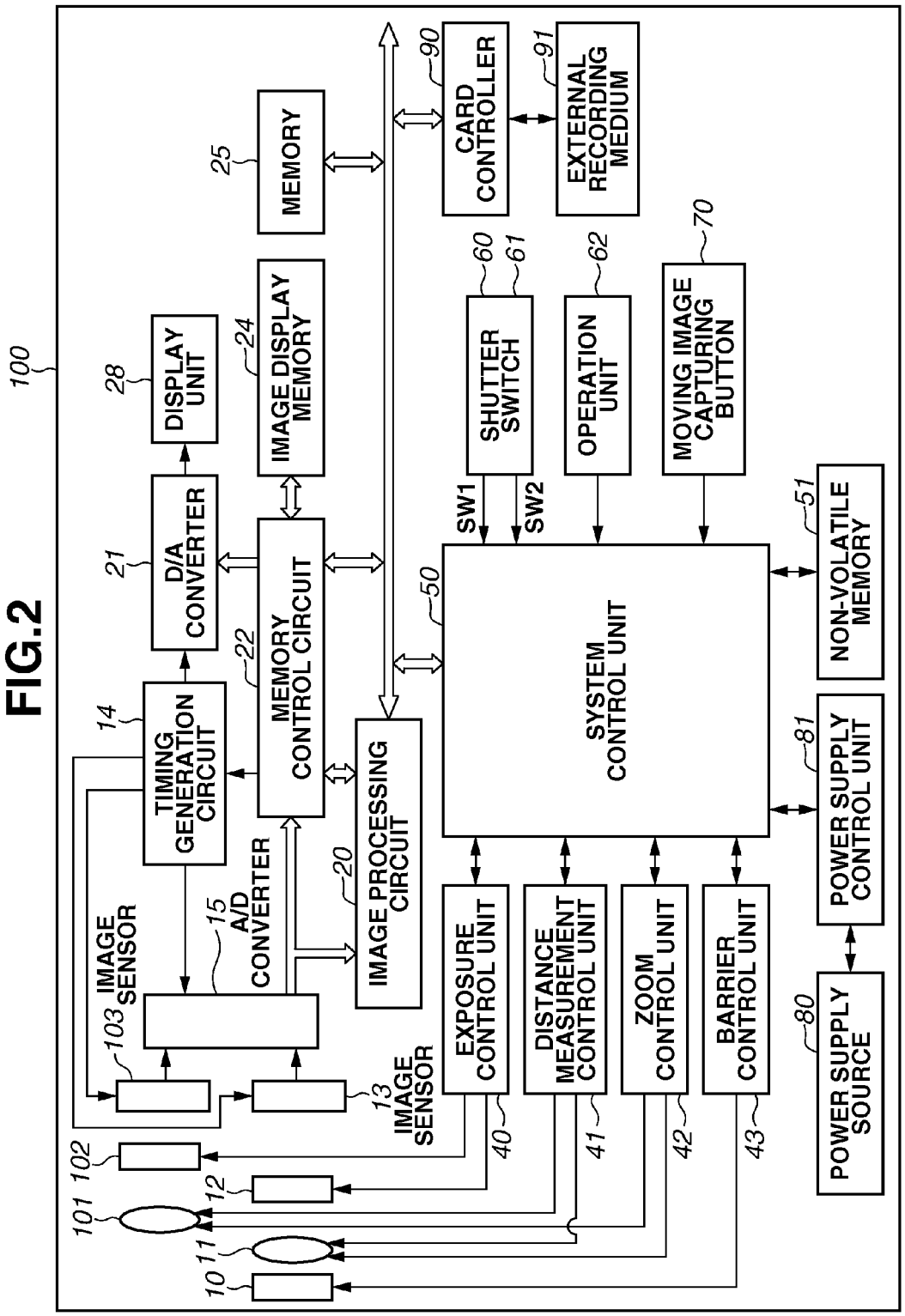
FIG. 2 is a block diagram illustrating a configuration of the digital camera.

FIG. 2 is a block diagram illustrating a configuration of the digital camera 100 according to the exemplary embodiment.

A protection unit 10 is a barrier for covering the imaging units including an imaging lens 11 of the digital camera 100 thereby to prevent contaminations or damages of the imaging units. The imaging lens 11, a shutter 12 including an aperture function, an image sensor including a charge-coupled device (CCD) or a complementary metal-oxide semiconductor (CMOS) device for converting an optical image into an electric signal, and an A/D converter 15 for converting an analog signal from the image sensor 13 into a digital signal thereby to acquire image data are provided. The out-camera is configured of the barrier 10, the imaging lens 11, the shutter 12, and the image sensor 13.

Similarly, in addition to the imaging lens 11, an imaging lens group 101 includes a zoom lens and a focus lens arranged in a direction in which the photographer using the digital camera 100 can be captured. A shutter 102 includes an aperture function. An image sensor 103 includes CCD or CMOS device for converting an optical image of the photographer side into an electric signal. The in-camera includes the imaging lens 101, the shutter 102, and the image sensor 103.

A timing generation circuit 14 supplies a clock signal and control signal to the image sensors 13 and 103, the A/D converter 15, and a D/A converter 21, and is controlled by a memory control circuit 22 and a system control unit 50.

The in-camera can enable or disable the in-camera imaging function. When the in-camera imaging function is enabled, an image generated based on the data read from the image sensor 103, or an image captured by the in-camera is recorded in an external recording medium 91. When the in-camera imaging function is disabled, the image sensor 103 is not driven, or the in-camera does not operate. Alternatively, even if the image sensor 103 is driven to image an object, the data is not read from the image sensor 103 and an image based on the output from the image sensor 103 is not recorded in the external recording medium 91.

An image processing circuit 20 performs predetermined pixel interpolation processing or color conversion processing on the data from the A/D converter 15 or the data from the memory control circuit 22.

The image processing circuit 20 performs predetermined calculation processing by use of the captured image data. The system control unit 50 controls an exposure control unit 40 and a distance measurement control unit 41 based on the acquired calculation result, and performs automatic focus (AF) processing, automatic exposure (AE) processing, and electronic flash pre-emission (EF) processing.

The image processing circuit 20 performs predetermined calculation processing by use of the captured image data and performs automatic white balance (AWB) processing based on the acquired calculation result.

Further, the image processing circuit 20 reads an image stored in a memory 25 to perform compression processing or decompression processing based on the Joint Photographic Experts Group (JPEG) system or Moving Picture Experts Group (MPEG)-4 Advanced Video Coding (AVC)/H.264 system, and writes the processed data into the memory 25.

The memory control circuit 22 controls the A/D converter 15, the timing generation circuit 14, the image processing circuit 20, an image display memory 24, the D/A converter 21, and the memory 25.

The data from the A/D converter 15 is written into the image display memory 24 or the memory 25 via the image processing circuit 20 and the memory control circuit 22 or via only the memory control circuit 22.

The image display memory 24 and the D/A converter 21 are provided in the digital camera 100. A display unit includes thin film transistors (TFT), liquid crystal display (LCD) or the like, and performs display based on the display image data written into the image display memory 24 via the D/A converter 21. When the captured image data is sequentially displayed on the display unit 28, an electronic finder function for displaying live videos can be realized. In this way, the display unit 28 is used for displaying the captured images, or a graphic user interface for changing the menu or setting. The display unit 28 includes a terminal for outputting a video signal to an external display device such as television (TV) set. The system control unit 50 may perform display control to display the captured images or the graphic user interface on an external display device, not only performing display control on the display unit 28.

The memory 25 stores captured still images or moving images, and has a sufficient storage capacity for storing the predetermined number of still images or moving images for a predetermined time. The memory 25 can be used as a working area of the system control unit 50.

The exposure control unit 40 individually controls the shutters 12 and 102 including the aperture function.

The distance measurement control unit 41 individually controls focusing of the imaging lenses 11 and 101, a zoom control unit 42 individually controls zooming of the imaging lenses 11 and 101, and a barrier control unit 43 controls the operation of the barrier 10.

The system control circuit 50 entirely controls the digital camera.

A non-volatile memory 51 is electrically erasable/recordable, and an electrically erasable and programmable read only memory (EEPROM) is used, for example. The non-volatile memory 51 records programs and various items of setting information therein.

A shutter switch SW1 is turned ON while the user is operating (half-pressing) a shutter button 60, and a SW1 signal is input into the system control unit 50. When a SW1 signal is input, the system control unit 50 performs instruction to start an imaging preparation operation such as the AF processing, the AE processing, the AWB processing, or the EF processing. When the user completely operates (completely presses) the shutter button 60, a shutter switch SW2 is turned ON and a SW2 signal is input into the system control unit 50. When the SW2 signal is input, the system control unit 50 instructs the out-camera to start the still image capturing/recording operations. When the system control unit 50 performs instruction to start the still image capturing/recording operation, the out-camera first performs the exposure processing of converting a signal read from the image sensor 13 into image data via the A/D converter 15 and writing the image data into the memory 25 via the memory control circuit 22. The out-camera performs development processing using calculations in the image processing circuit 20 or the memory control circuit 22 on the image data written into the memory 25, and the image processing circuit 20 compresses the image data that has been subjected to the development processing and stores the compressed image data in the memory 25. Thereafter, the compressed image data is read from the memory 25 and is written into the external recording medium 91 via a card controller 90. In this way, the out-camera performs a series of still image capturing and still image recording operations, such as capturing and recording still image data, in response to the input of the SW2 signal.

The operation unit 62 includes various buttons and a touch panel for inputting various operation instructions to the system control unit 50. The buttons include a power supply button, a menu button, a mode switch for switching the imaging mode/reproduction mode/other special imaging mode, cross key, and a set button. The buttons further include a macro button, a multi-screen reproduction page break button, a flash setting button, and a single imaging/ continuous imaging/self-timer switch button. The buttons further include a menu movement (+) button, a menu movement (−) button, a reproduced image movement (+) button, a reproduced image movement (−) button, a capturing image quality selection button, an exposure correction button, and a date/time setting button. Further, a voice recognition device or the like may be employed, and the operation unit 62 may be configured of the buttons or touch panel solely or in a combination thereof.

When the user operates (presses) a moving image capturing button 70, the system control unit instructs the out-camera to start capturing a moving image. When being instructed to start capturing a moving image, the out-camera reads out a signal from the image sensor 13, and the A/D converter 15 converts the signal to acquire image data, and the image processing circuit 20 performs the moving image compression processing on the acquired image data and stores the compressed image data in the external recording medium 91. The image processing circuit 20 periodically performs the moving image compression processing and recording processing to record the moving images in the external recording medium 91. The image processing circuit performs the moving image compression processing and recording processing until the user presses the moving image capturing button 70 again. When the user presses the moving image capturing button 70 again, the moving image compression processing is terminated, and the moving image recorded so far is recorded as one moving image file into the external recording medium 91.

A power supply control unit 81 is provided to control power supply.

A power supply source 80 includes a primary battery such as an alkaline battery or a lithium battery, a secondary battery such as a NiCd battery, a NiMH battery or a Li battery, an AC adapter, or the like.

The card controller 90 exchanges data with an external recording medium such as a memory card. The external recording medium 91 is a memory card or the like.

<Still Image/Moving Image Simultaneous Capturing-Recording Mode>

The digital camera 100 has a still image/moving image simultaneous capturing-recording mode as a still image capturing mode. In the still image/moving image simultaneous capturing-recording mode, when the user completely presses the shutter button 60, the out-camera captures and records a still image, and additionally records a moving image captured before the still image capturing in the external recording medium 91. In the still image/moving image simultaneous capturing-recording mode, the out-camera automatically records a moving image (short movie) while capturing a still image, and records a moving image (short movie) recorded in the still image/moving image simultaneous capturing-recording mode in the same moving image file every time. Therefore, even if the user operates nothing, the user can automatically create a moving image capturing the situation when a still image is captured therein, and can acquire one digest moving image by which the user can continuously view the moving image (short movie) acquired by capturing the still image several times. Subsequently, a moving image file recording a moving image (short movie) therein in the still image/moving image simultaneous capturing-recording mode will be referred to as a digest moving image file. The user can set the still image/moving image simultaneous capturing-recording mode by switching the still image capturing mode using the mode switch included in the operation unit 62.

In the still image/moving image simultaneous capturing-recording mode, the user can enable or disable the in-camera imaging function as described above. When the in-camera imaging function is enabled, an image captured by the in-camera can be superimposed on and combined with an image captured by the out-camera and recorded. The user can operate the operation unit to enable or disable the in-camera imaging function. The user can set not the in-camera imaging function but the display ON/OFF of an image captured by the in-camera, and thus the user may enable in-camera imaging function when the in-camera image display is set ON, and the user may disable the in-camera imaging function when the in-camera image display is set OFF.

In the still image/moving image simultaneous capturing-recording mode, the user can further set the stop motion ON/OFF by operating the operation unit. When the stop motion setting is ON, the out-camera creates a stop motion image obtained by converting a captured still image into a moving image, and records the created stop motion image in a moving image file in the still image/moving image simultaneous capturing-recording mode. That is, the out-camera records the stop motion image subsequent to the moving image (short movie) before the still image capturing. When the stop motion setting is OFF, the out-camera does not generate nor record a stop motion image. When the stop motion setting is ON and the in-camera imaging function is enabled, a combined moving image in which a stop motion image of the captured still image is combined with a moving image captured by the in-camera is recorded. In the present exemplary embodiment, the stop motion means a static moving image. By repeatedly performing converting processing of a piece of image data obtained when capturing a still image into a piece of moving image data, the stop motion for a predetermined time period is generated. Since moving image data for a predetermined time is generated from a piece of image data, the stop motion is a moving image including the continuous same image without motion.

When the user presses the moving image capturing button 70 in the still image/moving image simultaneous capturing-recording mode, the out-camera starts to capture and record a moving image, and does not capture a still image. When the in-camera imaging function is enabled, the moving image recorded at this time is combined with a moving image captured by the in-camera and recorded, and when the in-camera imaging function is disabled, only the moving image captured by the out-camera is recorded.

In other words, in the still image/moving image simultaneous capturing-recording mode, a still image and a moving image are recorded when the system control unit 50 issues an instruction to capture a still image via the shutter button 60, and a moving image is recorded but a still image is not recorded even if the system control unit 50 issues an instruction to shoot a moving image via the moving image capturing button 70.

<Imaging Processing in Still Image/Moving Image Simultaneous Capturing-Recording Mode>

Figure 3:
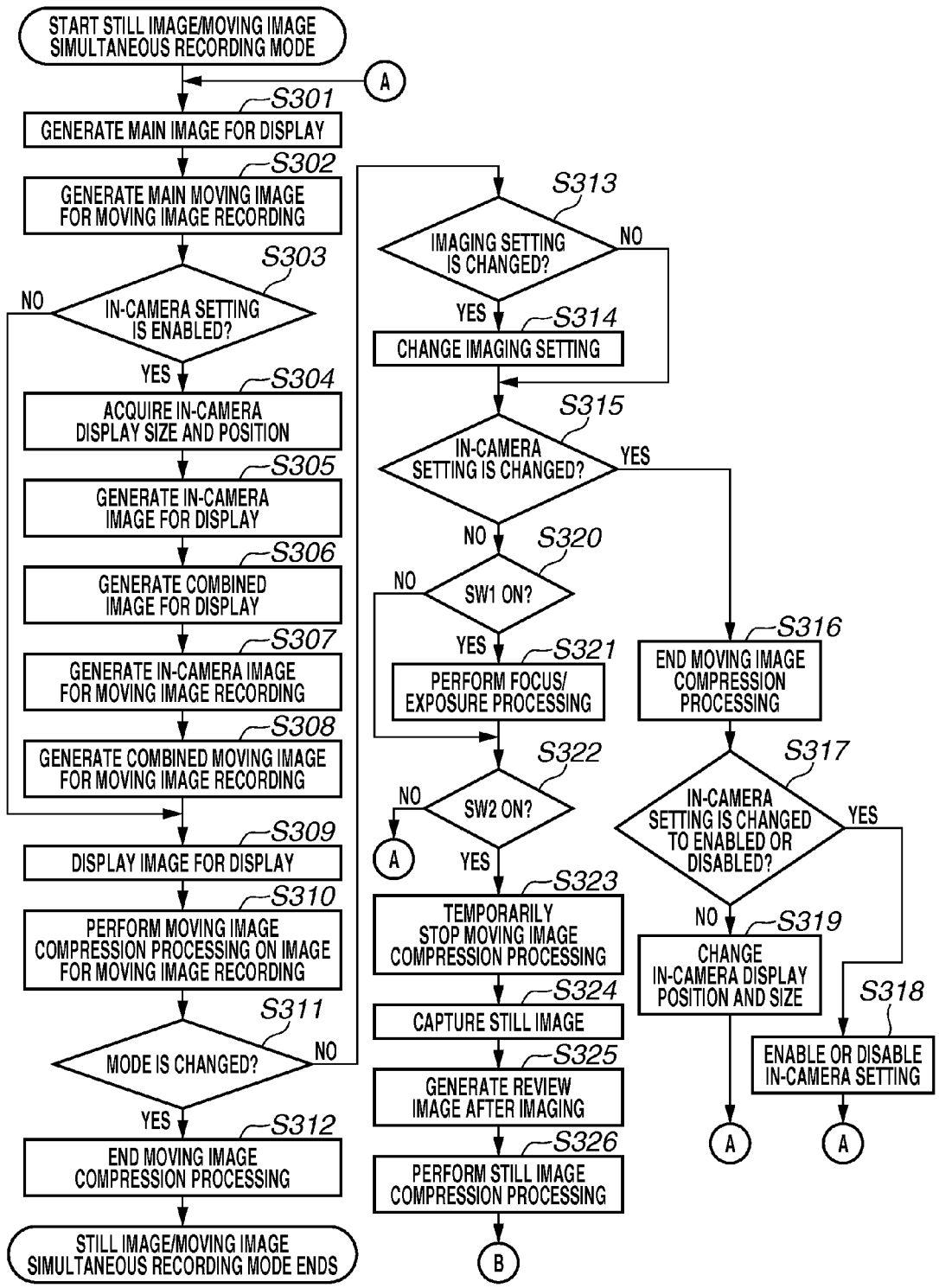
FIG. 3 is a flowchart illustrating imaging processing in a still image/moving image simultaneous capturing mode.
Figure 4:
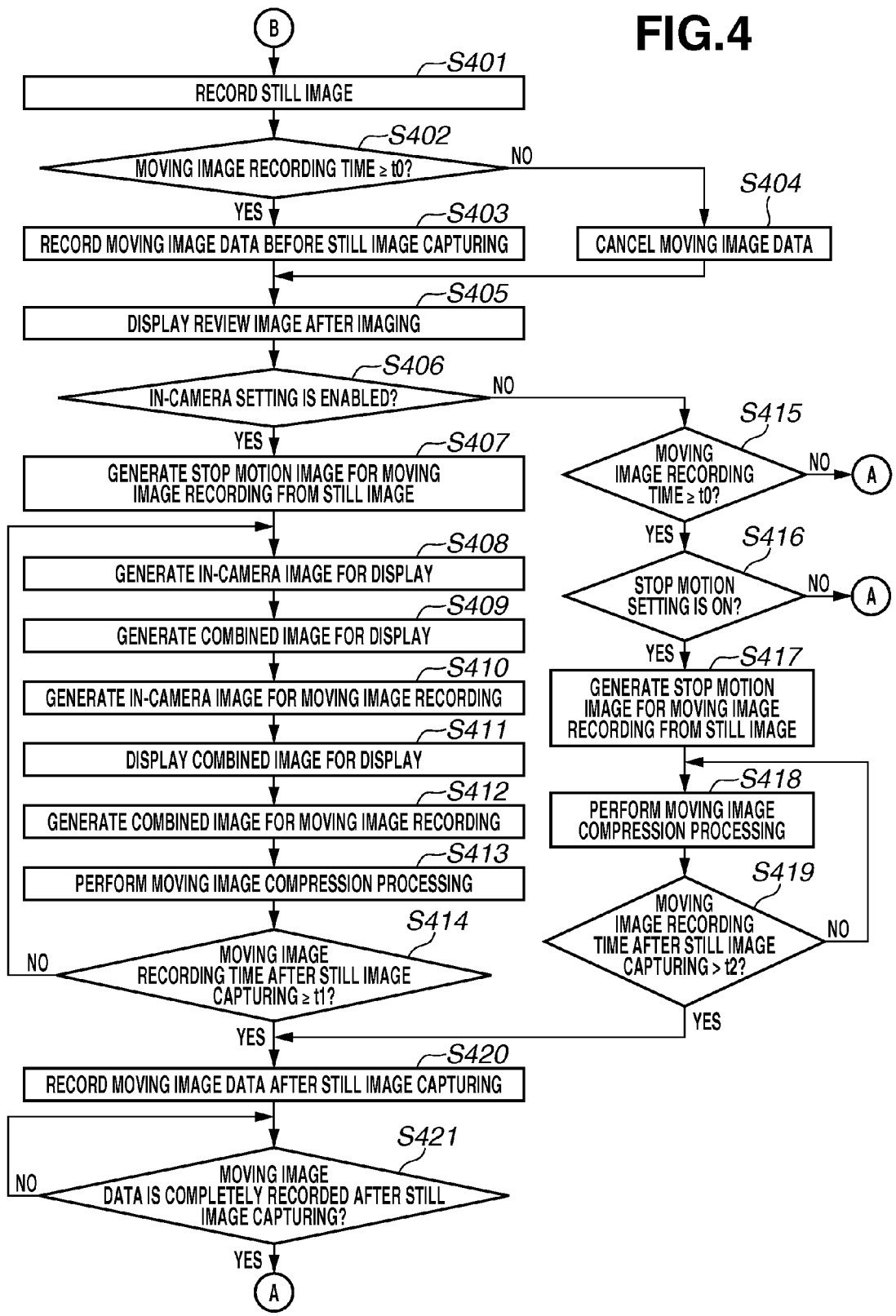
FIG. 4 is a flowchart illustrating the imaging processing in the still image/moving image simultaneous capturing mode.

FIGS. 3 and 4 illustrate an imaging operation in the still image/moving image simultaneous capturing-recording mode of the digital camera 100. The system control unit 50 can perform the processing by controlling each unit, performing the calculation processing, and making a determination based on the program read from the non-volatile memory 51.

When the user first selects the still image/moving image simultaneous capturing-recording mode in the digital camera 100, an image for display is generated based on the output of the appropriately exposed image sensor 13 controlled by the exposure control unit 40 in step S301. In other words, the image for display is generated based on a main image captured by the out-camera. Herein below, the image created based on the output of the image sensor 13 of the out-camera will be referred to as a main image. The generated image for display is temporarily stored in the memory 25.

In step S302, an image for recording a moving image (main moving image) is generated based on the main image, which is the output of the image sensor 13 of the out-camera. Hereinbelow, the moving image created based on the output of the image sensor 13 of the out-camera will be referred to as a main moving image. The generated image for recording a moving image is temporarily stored in the memory 25.

In step S303, the user confirms the setting of the in-camera set in the digital camera 100. When the in-camera imaging function is enabled (YES in step S303), the operation proceeds to step S304, and the processing in steps S304 to S308 are performed. When the in-camera imaging function is disabled (NO in step S303), the operation proceeds to step S309 without performing the processing in steps S304 to S308.

In step S304, the system control unit 50 acquires the setting on the display position and display size of the in-camera set in the digital camera 100, from the non-volatile memory 51. In the present exemplary embodiment, the user can designate a display position or display size of the in-camera via the menu or the like, and the information on the set display position and display size is stored in the non-volatile memory 51.

In step S305, an in-camera image for display is generated based on the output of the appropriately exposed image sensor 103 controlled by the exposure control unit 40. The size of the generated image is determined based on the size acquired in step S304.

Figure 5A:
FIGS. 5A and 5B illustrate example images captured and displayed in the still image/moving image simultaneous capturing mode.
Figure 5B:
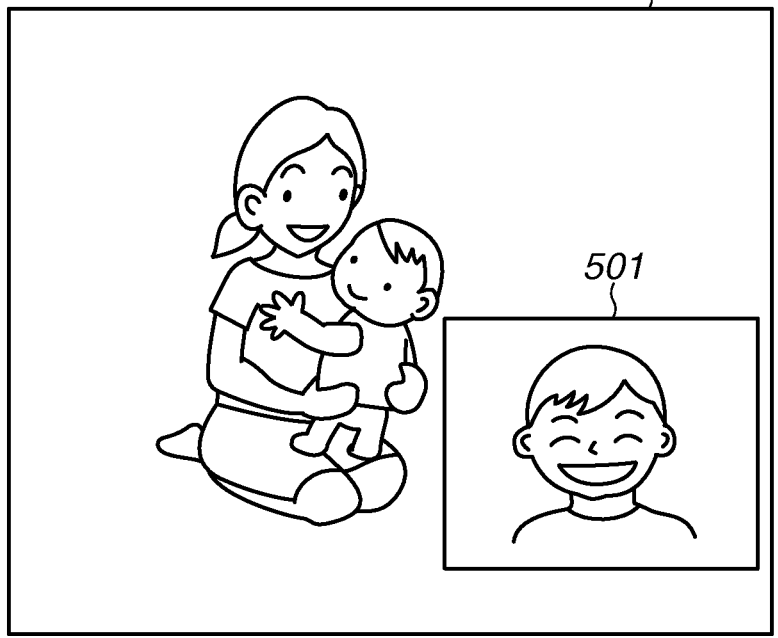

In step S306, the image processing circuit 20 combines the image for display as the main image created in step S301 with the in-camera image for display created in step S305 to generate a combined image for display. The image created at this time is such that the in-camera image is superimposed on and combined with the main image as illustrated in FIG. 5B, for example. As illustrated in FIGS. 5A and 5B, when the in-camera image 501 for display is superimposed on the main image 500 for display, the position where the in-camera image 501 for display is superimposed conforms to the in-camera display position information acquired in step S304. The combined image for display generated in step S306 is temporarily stored in the memory 25 to be overwritten on the image for display stored in the memory 25 in step S301. In other words, the image for display stored in the memory 25 is changed from the main image generated in step S301 to the combined image generated in step S306. The in-camera image is superimposed on and combined with the main image as illustrated in FIG. 5B according to the present exemplary embodiment, but a small main image may be superimposed on and combined with the in-camera image.

In step S307, an in-camera moving image for moving image recording is generated based on the output of the appropriately exposed image sensor 103 controlled by the exposure control unit 40. Hereinbelow, the moving image created based on the output of the image sensor 103 of the in-camera will be referred to as in-camera moving image. The size of the generated in-camera moving image is determined based on the size acquired in step S304.

In step S308, the main moving image for moving image recording created in step S302 is combined with the in-camera moving image for moving image recording created in step S307 thereby to generate a combined moving image as a moving image for moving image recording. The in-camera moving image for moving image recording is superimposed on the main moving image for moving image recording thereby to create a combined moving image according to the in-camera display position information similarly as in step S306 so as to combine the in-camera moving image at a similar position to the image for display. As a result, the image sizes of the image for display generated in step S301 or S306 and the moving image for moving image recording generated in step S302 or S308 are different from each other in the main image and the in-camera image. However, the image for display and the moving image for moving image recording are created so that the size ratios of the main image and the in-camera image are the same, and the image for display and the moving image are created so that the displayed image is the same as the image to be recorded. The combined moving image for moving image recording generated in step S308 is temporarily recorded as an image for moving image recording in the memory 25. As a result, the image for moving image recording recorded in the memory 25 is rewritten from the main moving image generated in step S302 to the combined moving image generated in step S308.

In step S309, the image for display temporarily stored in the memory 25 is displayed on the display unit 28. Thus, when the in-camera imaging function is enabled, the combined image as illustrated in FIG. 5B, for example, generated in step S306 is displayed, and when the in-camera imaging function is disabled, the main image as illustrated in FIG. 5A generated in step S301 is displayed.

Then, in step S310, the image for moving image recording is read from the memory 25, the image processing circuit 20 performs the moving image compression processing on the read image to compress the read image into moving image data, and starts the moving image compression processing on the image for moving image recording to be stored in the memory 25. When the in-camera imaging function is enabled, the image processing circuit 20 generates moving image data based on the combined image generated in step S308, and when the in-camera imaging function is disabled, the image processing circuit 20 generates moving image data based on the main image generated in step S302 and stores the generated moving image data in the memory 25. The image processing circuit 20 compresses the moving image data, and additionally compresses audio data input via a microphone (not illustrated) by use of the audio compression processing included in the system control unit 50, and stores the compressed moving image data and audio data in the memory 25. The processing in steps S301 to S310 is repeated in the still image/moving image simultaneous capturing-recording mode. Herein, the memory 25 holds the moving image data for up to 4 seconds compressed in the ring buffer format therein.

In this way, the image processing circuit 20 performs the processing of generating and displaying an image for display and the processing of generating an image for moving image recording and compressing a moving image (temporarily recording in the memory 25) in steps S301 to S310. The processing is not limited to the above order. The image processing circuit 20 may perform the processing of generating and displaying an image for display and the processing of generating and temporarily recording an image for moving image recording in parallel.

Then, in step S311, the system control unit 50 determines whether the mode is changed from the still image/moving image simultaneous recording mode to other mode. The mode change includes a change to other imaging mode or transition to the reproduction mode by the mode switch, a transition to the setting menu by the menu button, power OFF by the power supply switch, and the like. When the system control unit 50 determines that the mode is changed in step S311 (YES in step S303), the operation proceeds to step S312. In step S312, the image processing circuit 20 terminates the moving image compression processing, discards the moving image data and audio data stored in the memory 25 and terminates the still image/moving image simultaneous recording mode. When the system control unit 50 determines that the mode is not changed in step S311 (NO in step S303), the operation proceeds to step S313.

In step S313, the system control unit 50 confirms whether the imaging setting is changed. The changeable imaging setting items to be confirmed include the imaging conditions required to be rapidly switched depending on an object or situation on imaging, such as white balance, exposure correction value, focus switch of MF/macro imaging, and image size or compression rate of still image. The imaging setting is temporarily superimposed on the screen displaying the GUI screen thereon for user's changing the imaging setting in response to a user operation on the imaging setting change button assigned to the operation unit 62 or the touch panel provided on the display unit 28. The user can change the imaging setting by operating the operation unit 62 or the touch panel on the GUI screen. When the system control unit 50 determines that the imaging setting is changed in step S313 (YES in step S313), the operation proceeds to step S314. In step S314, the system control unit 50 changes the imaging setting in response to the user's change, and when the user does not change the imaging setting (NO in step S313), the operation proceeds to step S315.

In step S315, the system control unit 50 confirms whether the setting of the in-camera is changed. The setting of the in-camera has the items capable of being set in response to a user's operation. The settable items include a display position, a display size, and a switch to enable or disable the in-camera imaging function. The user can change the setting items of the in-camera by operating the operation unit 62 or the touch panel provided on the display unit 28.

When the system control unit 50 determines that the in-camera setting is changed in step S315 (YES in step S315), the operation proceeds to step S316. In step S316, the image processing circuit 20 stops the moving image compression processing and discards the moving image data and audio data stored in the memory 25. This operation is performed to prevent the situation that when the in-camera display setting is changed, the in-camera display switching is recorded between the moving image data recorded so far and the moving image data to be captured, which causes a reduction in quality of the moving image data. Then, in step S317, the system control unit 50 confirms whether the changed in-camera setting is to enable/disable the in-camera imaging function. When determining that the in-camera imaging function enable/disable is switched in step S317 (YES in step S317), the system control unit 50 changes the in-camera setting to be enabled or disabled in response to a user's instruction in step S318. Then, the operation returns to step S301 to perform the processing in and subsequent to step S301 again based on the changed setting. When it is determined that the in-camera setting changed in step S317 is not the in-camera imaging function enable/disable but the in-camera display position and size (NO in step S317), the system control unit 50 changes the in-camera display position and size according to a user's instruction in step S319. Thereafter, the operation proceeds to step S301 to perform the processing in and subsequent to step S301 again according to the newly-set contents.

When the in-camera setting is not changed (NO in step S315), the operation proceeds from step S315 to step S320. In step S320, the system control unit 50 confirms whether the shutter button 60 is half-pressed and the SW1 signal is input. When the SW1 signal is not input (NO in step S320), the operation proceeds to step S322 without performing the processing in step S321. When the SW1 is input (YES in step S320), the operation proceeds to step S321. In step S321, the system control unit 50 performs the imaging preparation operation such as the focus/exposure processing according to the focus mode or exposure mode set in the digital camera 100.

In step S322, the system control unit 50 confirms whether the shutter button 60 is completely pressed and the SW2 signal is input thereto. When the SW2 signal is not input (NO in step S322), the operation returns to step S301 to repeat the processing. In step S322, when the SW2 signal is input (YES in step S322), in step S323, the system control unit 50 temporarily stops displaying the image on the display unit 28, and temporarily stops the moving image compression processing started in step S310. Herein, the stored moving image data and audio data are held in the memory 25.

Then, in step S324, the out-camera captures still image data (main still image) to be recorded based on the output of the image sensor 13 of the out-camera. Then, in step S325, the out-camera generates a review image for image conformation based on the still image data (main still image) captured in step S324. Then, in step S326, the image processing circuit 20 performs the still image compression processing on the still image data (main still image) captured in step S324, generates still image data to be recorded (JPEG data), and stores the generated still image data in the memory 25. In the present exemplary embodiment, in the still image/moving image simultaneous capturing-recording mode, only a main image not combined with an in-camera image is recorded as a still image in the external recording medium 91 irrespective of the setting of the enabled or disabled in-camera imaging function, and thus the image processing circuit 20 performs the still image compression processing on the main still image.

Thereafter, the operation proceeds to step S401 illustrated in FIG. 4.

In step S401, the image processing circuit 20 records the still image data (JPEG data) stored in the memory 25 in step S326 as one still image file (JPEG file) in the external recording medium 91.

Then, in step S402, the system control unit 50 determines whether a moving image recording time (imaging time) of the moving image data for moving image recording stored in the memory 25 is longer than a predetermined time (t0). In the present exemplary embodiment, t0=2 seconds is assumed. In step S402, when the system control unit 50 determines that the moving image recording time is 2 seconds or longer (YES in step S402), the operation proceeds to step S403, and when the system control unit 50 determines that the moving image recording time is shorter than 2 seconds (NO in step S402), the operation proceeds to step S404.

In step S403, the moving image data and audio data stored in the memory 25 are recorded into the external recording medium 91. Herein, the system control unit 50 records the moving image data and audio data in addition to the moving image data and audio data in a digest moving image file recorded in the external recording medium 91. The system control unit 50 classifies the moving images by chapters per still image capturing and records the classified moving images in the digest moving image file so that a moving image corresponding to still image capturing can be discriminated. The system control unit 50 records the still image specification information capable of specifying a still image file corresponding to each chapter as chapter information, and associates the still image with the moving image. The still image specification information may employ a file name or imaging time of the corresponding still image file. The chapter information may describe therein the still image specification information, or the start position (start frame) and time (number of frames) or end position (end frame) of each chapter in the moving image data, and record them in the header part of the digest moving image file. Thereby, the system control unit 50 can determine a moving image corresponding to the still image file included in the digest moving image file without analyzing the entire moving image data. When the digest moving image file is not present in the external recording medium 91, the user creates a new digest moving image file and records the moving image data and audio data read from the memory 25 therein. When a imaging time is changed or the moving image data size is larger than a predetermined size, the user creates and records a new digest moving image file. In step S404, the image processing circuit 20 discards the moving image data and audio data stored in the memory 25. That is, when the moving image recording time (imaging time) is shorter than 2 seconds, the moving image data and audio data, which are captured before a still image is captured in step S325 and are temporarily stored in the memory 25, are not recorded nor stored in the external recording medium 91. This is because the user cannot confirm the situation on the imaging with a remarkably short moving image, and thus in the present exemplary embodiment, a moving image of shorter than 2 seconds is not recorded in the external recording medium 91.

Then, in step S405, the display unit 28 displays a review image created in step S325 thereon. The user can confirm the captured still image through the display.

In step S406, the system control unit 50 determines whether the in-camera imaging function is enabled or disabled. When the system control unit 50 determines that the in-camera imaging function is enabled (YES in step S406), the operation proceeds to step S407. In step S407, the image processing circuit 20 performs the processing of generating a moving image after still image capturing combined with an in-camera image in steps S407 to S414. When the in-camera setting is disabled (NO in step S406), the operation proceeds to step S415.

In step S407, the image processing circuit 20 generates a stop motion image for moving image recording based on the main still image captured by the out-camera in step S324. That is, the image processing circuit 20 converts the main still image into moving image data. Herein, when the aspect ratios of the still image and the moving image recorded in the external recording medium 91 are different from each other, the image processing circuit 20 performs the resize processing on the main still image in such a manner that the entire main still image is included in the stop motion image, and generates a stop motion image with the areas other than the main still image in black. For example, when the aspect ratio of the still image is 4:3 and the aspect ratio of the moving image is 16:9, the image processing circuit 20 generates a stop motion image with the right and left areas in black.

Then, in step S408, the image processing circuit 20 generates an in-camera image for display based on the output of the image sensor 103 similarly as in step S305.

Then, in step S409, the image processing circuit 20 generates a combined image for display similarly as in step S306. In step S409, the image processing circuit 20 combines the main still image captured by the out-camera in step S324 with the in-camera image generated in step S408 thereby to generate a combined image for display.

Next, in step S410, the image processing circuit 20 generates an in-camera moving image for moving image recording based on the output of the image sensor 103 similarly as in step S307.

In step S411, the display unit 28 displays the combined image for display generated in step S409 thereon. Herein, the image captured by the in-camera is displayed as a moving image on the still image captured by the out-camera and recorded in the external recording medium 91.

Next, in step S412, the image processing circuit 20 generates a combined moving image combined with an in-camera moving image as an image for moving image recording similarly as in step S308. In step S412, the image processing circuit 20 combines the in-camera moving image generated in step S410 with the stop motion image generated in step S407 thereby to generate a combined image for moving image recording.

In step S413, the image processing circuit 20 performs the moving image compression processing on the combined moving image generated in step S412 to generate moving image data, and stores the generated moving image data as moving image data after still image capturing in the memory 25 similarly as in step S310. The image processing circuit 20 compresses the moving image data, and additionally compresses shutter sound data previously stored in the non-volatile memory 51 and audio data input via a microphone (not illustrated) by use of the audio compression processing included in the system control unit 50, and stores the compressed data in the memory 25.

In step S414, the system control unit 50 determines whether the moving image recording time (imaging time) of the moving image data after still image capturing generated in step S413 and stored in the memory 25 is a predetermined time t1 or longer. In the present exemplary embodiment, t1=2 seconds is assumed. When the system control unit 50 determines that the moving image recording time of the moving image data is 2 seconds or longer (YES in step S414), the operation proceeds to step S420. When the system control unit 50 determines that the moving image recording time of the moving image data is shorter than 2 seconds (NO in step S414), the operation proceeds to step S408 to repeatedly perform the processing in steps S408 to S414. Thus, when the in-camera imaging function is enabled, the in-camera captures a moving image until the moving image recording time of the moving image data after still image capturing reaches 2 seconds after the still image review starts to be displayed. The image processing circuit 20 repeatedly performs the processing of displaying an image combining a stop motion image and an in-camera moving image therein and the moving image compression processing on a combined image until the moving image recording time of the moving image data after still image capturing reaches 2 seconds.

In step S411, the in-camera captures a moving image while the still image captured by the out-camera and recorded in the external recording medium 91 is being displayed. Thus, the in-camera can capture the user's (photographer's) face confirming the captured still image on the display unit 28 and record it together with the still image.

In step S415, the system control unit 50 determines whether the moving image recording time (imaging time) of the moving image data for moving image recording captured before still image capturing is t0 or longer. The system control unit 50 may determine whether the moving image data is subjected to the cancel processing in step S404 instead of determining the moving image recording time. When the cancel processing is performed since the moving image recording time of the moving image before still image capturing is shorter than t0 (NO in step S415), the operation returns to step S301 to repeat the processing from the beginning. When the system control unit 50 determines that the moving image recording time of the moving image before still image capturing is t0 or longer and the cancel processing is not performed (YES in step S415), the operation proceeds to step S416.

In step S416, the system control unit 50 determines whether the stop motion setting is ON or OFF. When the stop motion setting is ON (YES in step S416), the operation proceeds to step S417, and when the stop motion setting is OFF (NO in step S416), the operation returns to step S301.

In step S417, the image processing circuit 20 generates a stop motion image similarly as in step S407.

Next, in step S418, the image processing circuit 20 performs the moving image compression processing on the stop motion image generated in step S417, and stores the compressed image as moving image data after still image capturing in the memory 25. The audio data to be compressed herein is shutter sound data and silent data previously stored in the non-volatile memory 51.

In step S419, the system control unit 50 determines whether the moving image recording time (imaging time) of the moving image data after still image capturing subjected to the moving image compression processing in step S418 and temporarily stored in the memory 25 is a predetermined time t2 or longer. In the present exemplary embodiment, t2=1 second is assumed. When the system control unit 50 determines that the moving image recording time of the moving image data after still image capturing is not 1 second or longer in step S419 (NO in step S419), the image processing circuit 20 repeatedly performs the moving image compression processing on the stop motion image in step S418. When the system control unit 50 determines that the moving image recording time of the moving image data after still image capturing is 1 second or longer in step S419 (YES in step S419), the operation proceeds to step S420. Using the same stop motion image generated in step S417, the moving image compression processing in step S418 is repeated. The resultant data (moving frame) generated by the repetition thereof is added to the moving image data after the still image already stored in the memory 25. Therefore, by repeating the moving image compression processing in step S418, the number of moving frames of the moving image data after the still image is increased. As a result, the moving image recording time of the moving image data after the still image is increased. As the resultant data (moving frame) generated by using the same image (stop motion image) is recorded repeatedly, the moving image data after the still image becomes a static moving image.

In step S420, the image processing circuit 20 records the moving image data after still image capturing created in the moving image compression processing in step S413 or step S419 in the external recording medium 91. On recording, the image processing circuit 20 records the moving image data in addition to the moving image data and audio data in the digest moving image file similarly as in step S403. Thus, when the moving image data before still image capturing is recorded in step S403, the image processing circuit 20 records the moving image data after still image capturing subsequent to the moving image data before still image capturing.

In step S421, the system control unit 50 determines whether the moving image data after still image capturing is completely recorded in step S420. When the system control unit 50 determines that the moving image data after still image capturing is completely recorded (YES in step S421), the moving image data temporarily stored in the memory 25 is deleted, and the operation returns to step S301.

<Various Settings and Moving Image Recording Patterns of Moving Images to be Recorded>

Moving image data to be recorded in the external recording medium 91 when the above-described imaging processing is performed in the still image/moving image simultaneous capturing-recording mode will be described below with reference to FIG. 6 and FIG. 7.

Figure 6:
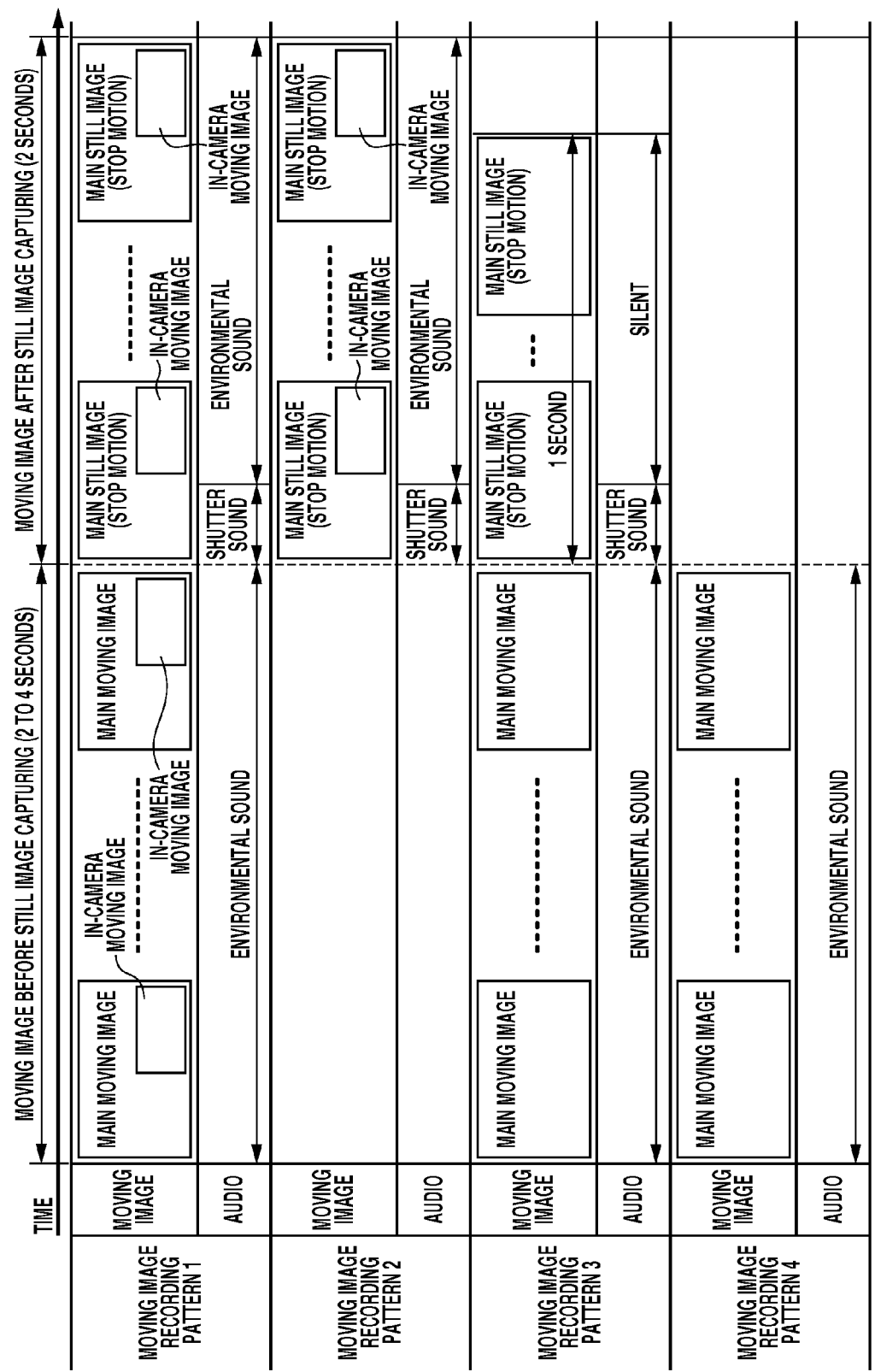
FIG. 6 is a diagram illustrating moving image recording patterns.

FIG. 6 is a diagram illustrating the moving image recording patterns. FIG. 7 is a table illustrating the relationships among an in-camera imaging function setting, a moving image data recording time (imaging time) before still image capturing, a stop motion setting, and a moving image pattern recorded in the external recording medium 91 in the still image/moving image simultaneous capturing-recording mode. Herein, the moving image data recording time before still image capturing indicates the moving image recording time (imaging time) of moving image data temporarily stored in the memory 25 before still image capturing.

Each moving image recording pattern will be described with reference to FIG. 6.

In the moving image recording pattern 1, a moving image before still image capturing for 2 to 4 seconds and a moving image after still image capturing for 2 seconds are recorded. In the moving image recording pattern 1, a combined moving image in which a main moving image captured by the out-camera is combined with an in-camera moving image captured by the in-camera is recorded as the moving image before still image capturing. A combined moving image in which a stop motion image generated based on a still image captured by the out-camera is combined with an in-camera moving image captured by the in-camera is recorded as the moving image after still image capturing. Environmental sounds input via a microphone are recorded for the audio data of the moving image before still image capturing, and shutter sound data and environmental sounds are sequentially recorded for the audio data of the moving image after still image capturing.

In the moving image recording pattern 2, the moving image before still image capturing is not recorded, and only the moving image after still image capturing for 2 seconds is recorded. In the moving image recording pattern 2, a combined moving image in which a stop motion image generated based on a still image captured by the out-camera is combined with an in-camera moving image captured by the in-camera is recorded as the moving image after still image capturing. Shutter sound data and environmental sounds are sequentially recorded for the audio data of the moving image after still image capturing. Thus, in the moving image recording pattern 2, the moving image data and audio data of the moving image after still image capturing are recorded in a similar format to the moving image after still image capturing recorded in the moving image recording pattern 1.

In the moving image recording pattern 3, the moving image before still image capturing for 2 to 4 seconds and a moving image after still image capturing for second are recorded. In the moving image recording pattern 3, a main moving image not combined with an in-camera moving image and captured by the out-camera is recorded as the moving image before still image capturing. Then, a stop motion image generated based on a still image captured by the out-camera is recorded as the moving image after still image capturing.

Environmental sounds input via a microphone are recorded for the audio data of the moving image before still image capturing, and only shutter sound data is recorded and then no sound is recorded for the audio data of the moving image after still image capturing.

In the moving image recording pattern 4, only the moving image before still image capturing for 2 to 4 seconds is recorded, and a moving image after still image capturing is not recorded. In the moving image recording pattern 4, a main moving image not combined with an in-camera moving image and captured by the out-camera is recorded as the moving image before still image capturing. Environmental sounds input via a microphone are recorded for the audio data of the moving image before still image capturing. Thus, in the moving image recording pattern 4, the moving image data and audio data of the moving image after still image capturing are recorded in a similar format to the moving image before still image capturing recorded in the moving image recording pattern 3.

Herein, the moving image data temporarily stored in the memory 25 in the processing in steps S301 to S310 is set at up to 4 seconds, and thus a moving image before still image capturing is for 4 seconds or shorter. In steps S402 to S404, the moving image before still image capturing is recorded in the external recording medium 91 only when the moving image data recording time before still image capturing stored in the memory 25 is 2 seconds or longer, and thus the moving image before still image capturing is for 2 to 4 seconds.

A moving image for 2 seconds is recorded as the moving image after still image capturing in the moving image recording patterns 1 and 2, while a moving image for 1 second is recorded as the moving image after still image capturing in the moving image recording pattern 3. Thereby, a stop motion image is combined with an in-camera moving image to record a combined moving image with motions in the moving image recording patterns 1 and 2. On the other hand, since a stop motion image with no motion is recorded in the moving image recording pattern 3, the recording time is short. In the present exemplary embodiment, a moving image to be recorded when a combined moving image with motions is recorded is set to 2 seconds (t1) as in the moving image recording patterns 1 and 2, and a moving image to be recorded when a moving image with no motion is recorded is set to 1 second (t2) as in the moving image recording pattern 3.

The relationship between each setting and a moving image recording pattern will be described below with reference to FIG. 7.

First, when the in-camera imaging function is enabled, the moving image recording pattern 1 or 2 is employed. More specifically, when the in-camera imaging function is enabled, a combined moving image in which a stop motion image is combined with an in-camera moving image is always recorded as the moving image after still image capturing irrespective of the moving image data recording time before still image capturing and the stop motion setting. Therefore, the face or reaction of the photographer viewing a still image can be recorded. When the in-camera imaging function is enabled, a combined image in which a main moving image is combined with an in-camera moving image is recorded as the moving image before still image capturing depending on whether the moving image data recording time before still image capturing is 2 seconds or longer. Thus, a combined image is recorded depending on whether the recording time is the predetermined t0 or longer. When the moving image data recording time before still image capturing is 2 seconds (t0) or longer, the moving image before still image capturing is recorded. Therefore, the situations or faces of the objects or photographer can be recorded immediately before still image capturing. When the moving image data recording time before still image capturing is shorter than 2 seconds (t0), the moving image before still image capturing is not recorded.

When the in-camera imaging function is disabled and the moving image data recording time before still image capturing is shorter than 2 seconds (t0), the moving images (moving image before still image capturing and moving image after still image capturing) are not recorded irrespective of the stop motion setting. In this case, the moving image data recording time before still image capturing is shorter than 2 seconds, and thus the moving image before still image capturing is not recorded as described in steps S402 to S404. A stop motion image can be recorded as the moving image after still image capturing depending on the stop motion setting for the moving image after still image capturing, while a stop motion image not combined with an in-camera moving image is recorded when the in-camera imaging function is disabled. If an in-camera moving image is not combined, a moving image with no motion is generated. Therefore, when the in-camera imaging function is disabled and the moving image data recording time before still image capturing is shorter than 2 seconds, the moving image after still image capturing is not recorded irrespective of the stop motion setting.

When the in-camera imaging function is disabled and the moving image data recording time before still image capturing is 2 seconds (t0) or longer, the moving image recording pattern 3 or 4 is employed to record the moving image before still image capturing. Therefore, a change in situations or the faces of the objects immediately before still image capturing can be recorded. Whether to record is determined depending on the stop motion setting. When the stop motion setting is ON, a stop motion image not combined with an in-camera moving image is recorded as the moving image after still image capturing in the moving image recording pattern 3. When the stop motion setting is OFF, the moving image after still image capturing is not recorded in the moving image recording pattern 4. A stop motion image with no motion is recorded as the moving image after still image capturing in the moving image recording pattern 3. Thus, a stop motion image with no motion is recorded since both of the images before still image capturing and during imaging can be confirmed by recording a stop motion image together with a moving image before imaging.

When the moving image data recording time before still image capturing is 2 seconds (t0) or longer, the moving image before still image capturing is always recorded in the moving image recording pattern 1, 3, or 4 irrespective of other settings. When the moving image data recording time before still image capturing is shorter than seconds (t0), the moving image recording pattern 2 is employed or a moving image is not recorded. Typically, when the moving image data recording time before still image capturing is shorter than 2 seconds, the moving images (moving image before still image capturing and moving image after still image capturing) are not recorded, while when the in-camera imaging function is enabled, an in-camera moving image can be acquired after still image capturing. Therefore, a combined moving image in which a stop motion image is combined with an in-camera moving image is recorded as the moving image after still image capturing as in the moving image recording pattern 2.

As described above, the imaging processing is performed in the still image/moving image simultaneous capturing-recording mode thereby to record a moving image in an appropriate moving image recording pattern depending on the setting illustrated in FIG. 7. The moving image recording pattern or whether to record a moving image depends on the setting illustrated in FIG. 7 in the still image/moving image simultaneous capturing-recording mode, but a still image is recorded depending on a set recording size or compression rate irrespective of the setting illustrated in FIG. 7.

Other Embodiments

The present invention has been described above in detail by way of the exemplary embodiments, but the present invention is not limited to the exemplary embodiments and encompasses various forms without departing from the scope of the present invention. The imaging apparatus to which the present invention is applied has been described in the exemplary embodiments, but the present invention may be accomplished in electronic devices such as camera-mounted mobile phones and portable game machines. The functions according to the exemplary embodiments may be accomplished in a system connected with a control device including a plurality of devices such as an imaging apparatus with a plurality of imaging units, a display device with a display unit, and a control unit, not in one device. Some parts of the exemplary embodiments may be accomplished in combination as needed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2013-269685 filed Dec. 26, 2013, and No. 2013-269686 filed Dec. 26, 2013, which are hereby incorporated by reference herein in their entirety.

What is claimed is:

1. An imaging apparatus comprising:
   a first imaging unit;
   a second imaging unit;
   a still image capturing instruction unit configured to receive a still image capturing instruction to capture a still image by the first imaging unit; and
   a control unit configured to perform control, in response to the still image capturing instruction to capture a still image by the first imaging unit, to record a still image captured by the first imaging unit and a moving image captured by the second imaging unit after capturing the still image, in a recording medium,
   wherein the control unit performs control to record moving images captured by the first imaging unit and the second imaging unit before capturing the still image and a moving image captured by the second imaging unit after capturing the still image.

2. The imaging apparatus according to claim 1, wherein, in response to the still image capturing instruction, the control unit performs control to record the still image captured by the first imaging unit and the moving image for a predetermined time captured by the second imaging unit after capturing the still image in the recording medium.

3. The imaging apparatus according to claim 2, further comprising a display control unit configured to perform control to display, on a display unit, a still image captured by the first imaging unit in response to the still image capturing instruction,
   wherein the control unit records a moving image captured by the second imaging unit while the still image is being displayed on the display unit.

4. The imaging apparatus according to claim 1, wherein the control unit performs control to record the still image captured by the first imaging unit and a combined moving image generated by combining the moving image captured by the second imaging unit with the still image in response to the still image capturing instruction.

5. The imaging apparatus according to claim 1, further comprising a setting unit configured to select whether to record an image captured by the second imaging unit,
   wherein in a case where it is selected to record an image captured by the second imaging unit by the setting unit, the control unit controls the second imaging unit to capture a moving image.

6. The imaging apparatus according to claim 5,
   wherein in a case where it is selected not to record an image captured by the second imaging unit, the second imaging unit does not capture an image, or even if the second imaging unit captures an image, the image captured by the second imaging unit is not recorded in the recording medium.

7. The imaging apparatus according to claim 1,
   wherein the control unit performs control to record, as one continuous moving image, a combined moving image in which the moving image captured by the second imaging unit before capturing the still image is combined with the moving image captured by the first imaging unit before capturing the still image, and a combined moving image in which the moving image captured by the second imaging unit after capturing the still image is combined with the still image captured by the first imaging unit.

8. The imaging apparatus according to claim 1, wherein the first imaging unit and the second imaging unit are provided so that the first imaging unit captures an object and the second imaging unit captures a photographer.

9. The imaging apparatus according to claim 1, further comprising a display unit configured to display an image captured by the first imaging unit,
wherein the second imaging unit images an object located on a side where the display unit of the imaging apparatus is provided.

10. The imaging apparatus according to claim 1, wherein the control unit records the still image captured by the first imaging unit and the moving image captured by the second imaging unit in an associated manner in the recording medium.

11. A method for controlling a control device for controlling an imaging apparatus including a first imaging unit and a second imaging unit, the method comprising:
accepting a still image capturing instruction to capture a still image by the first imaging unit;
recording, in response to the still image capturing instruction to capture a still image by the first imaging unit, a still image captured by the first imaging unit and a moving image captured by the second imaging unit after capturing the still image, in a recording medium; and
recording moving images captured by the first imaging unit and the second imaging unit before capturing the still image and a moving image captured by the second imaging unit after capturing the still image.

12. A non-transitory computer readable storage medium storing therein a program for causing a computer to execute the control method according to claim 11.

13. An imaging apparatus comprising:
a first imaging unit;
a second imaging unit;
an imaging instruction unit configured to instruct the first imaging unit to capture a still image;
a still image recording unit configured to record a still image captured by the first imaging unit in a recording medium in response to an instruction by the imaging instruction unit to capture a still image;
a moving image recording unit configured to record an image captured by the first imaging unit as a moving image in the recording medium in response to the instruction by the imaging instruction unit to capture a still image;
a first setting unit configured to set whether to record an image captured by the first imaging unit as a moving image; and
a second setting unit configured to set whether to record an image captured by the second imaging unit,
wherein in a case where the second setting unit has set a setting to record an image captured by the second imaging unit, the moving image recording unit records an image in which an image captured by the first imaging unit is combined with an image captured by the second imaging unit as a moving image irrespective of the setting of the first setting unit.

14. The imaging apparatus according to claim 13, wherein the first setting unit is configured to allow a user to set whether to record a still image captured by the first imaging unit as a moving image in response to an instruction by the imaging instruction unit to capture a still image, and
wherein the moving image recording unit records a still image captured by the first imaging unit as a moving image in the recording medium in response to an instruction by the imaging instruction unit to capture a still image.

15. The imaging apparatus according to claim 13, wherein in a case where the second setting unit has not set a setting to record an image captured by the second imaging unit, the moving image recording unit switches between to or not to record a moving image depending on the setting of the first setting unit.

16. The imaging apparatus according to claim 13, wherein the moving image recording unit can record a moving image captured by the first imaging unit in the recording medium until the instruction is made by the imaging instruction unit to capture a still image, and in a case where an imaging time of the moving image captured by the first imaging unit until an instruction is made by the imaging instruction unit to capture a still image is a predetermined time or longer, the moving image recording unit records a moving image captured by the first imaging unit in the recording medium until an instruction is made by the imaging instruction unit to capture a still image.

17. The imaging apparatus according to claim 16, wherein in a case where an imaging time of a moving image captured by the first imaging unit until an instruction made by the imaging instruction unit to capture a still image is not a predetermined time or longer, the moving image recording unit does not record a moving image captured by the first imaging unit until the instruction made by the imaging instruction unit to capture a still image and an image captured by the first imaging unit after the instruction made by the imaging instruction unit to capture a still image as moving images in the recording medium.

18. The imaging apparatus according to claim 17, wherein in a case where the second setting unit has set a setting to record an image captured by the second imaging unit even if an imaging time of a moving image captured by the first imaging unit until the instruction made by the imaging instruction unit to capture a still image is not a predetermined time or longer, the moving image recording unit records an image captured by the first imaging unit after the instruction has been made by the imaging instruction unit to capture a still image as a moving image in the recording medium.

19. The imaging apparatus according to claim 13, further comprising a mode setting unit configured to set a simultaneous recording mode of recording a still image by the still image recording unit and recording a moving image by the moving image recording unit in response to the instruction made by the imaging instruction unit to capture a still image,
wherein the moving image recording unit records a plurality of moving images to be recorded in the recording medium in a predetermined moving image file in the simultaneous recording mode.

20. The imaging apparatus according to claim 13, wherein in a case where the setting is set by the second setting unit to record an image captured by the second imaging unit, the moving image recording unit combines an image captured by the first imaging unit with a moving image captured by the second imaging unit, and records a combined image in the recording medium.

21. The imaging apparatus according to claim 13, wherein in a case where the setting set by the second setting unit is not to record an image captured by the second imaging unit, the second imaging unit does not capture an image, or even if the second imaging unit captures an image, the image captured by the second imaging unit does not record in the recording medium.

22. A method for controlling an imaging apparatus including a first imaging unit and a second imaging unit, the method comprising:

accepting an instruction to capture a still image by the first imaging unit;

recording a still image captured by the first imaging unit in a recording medium in response to an acceptance of the instruction to capture a still image;

recording an image captured by the first imaging unit as a moving image in the recording medium in response to an acceptance of the instruction to capture a still image;

setting as a first setting whether to record an image captured by the first imaging unit as a moving image; and setting as a second setting whether to record an image captured by the second imaging unit, wherein when an image captured by the second imaging unit is set to be record as the second setting, an image in which an image captured by the first imaging unit is combined with an image captured by the second imaging unit is recorded as a moving image in the moving image recording irrespective of the setting in the first setting.

23. A non-transitory computer readable storage medium storing therein a program for causing a computer to execute the control method according to claim 22.

\* \* \* \* \*